United States Patent [19]
Papalexis

[11] Patent Number: 5,123,830
[45] Date of Patent: Jun. 23, 1992

[54] DOUGH PORTIONING MACHINE

[76] Inventor: Christopher G. Papalexis, 1 Foxhill Rd., Montvale, N.J. 07645

[21] Appl. No.: 703,016

[22] Filed: May 20, 1991

[51] Int. Cl.$^5$ ............................ A21C 5/00; A23P 1/00
[52] U.S. Cl. ....................................... 425/307; 83/145; 83/355; 83/651.1; 264/142; 425/311; 426/518
[58] Field of Search ............ 83/145, 355, 651.1; 264/142; 425/307, 311, 313; 426/503, 518

[56]       References Cited
        U.S. PATENT DOCUMENTS

|   |   |   |   |
|---|---|---|---|
| 557,505 | 3/1896 | Gloekler | 425/311 |
| 1,303,151 | 5/1919 | Bainbridge | 425/311 |
| 1,571,121 | 1/1926 | Humphreys | 425/311 |
| 2,838,012 | 6/1958 | Weidenmiller et al. | 425/311 |
| 3,927,611 | 12/1975 | Papalexis et al. | 425/203 |
| 4,025,260 | 5/1977 | Neel | 425/311 |
| 4,340,343 | 7/1982 | Mancini | 426/503 |
| 4,424,236 | 1/1984 | Campbell | 426/503 |
| 4,786,517 | 11/1988 | Pinto | 426/503 |
| 4,900,241 | 2/1990 | Sigurdsson | 83/651.1 |

Primary Examiner—Jay H. Woo
Assistant Examiner—Scott Bushey
Attorney, Agent, or Firm—Notaro & Michalos

[57]        ABSTRACT

A dough portioning machine includes a plurality of dough feeders for feeding dough under pressure from a hopper to a plurality of orifices. The dough blossoms through an open mouth of the orifice and is cut by a rotating wire moving in a circular path across the orifice mouth.

15 Claims, 3 Drawing Sheets

DOUGH PORTIONING MACHINE

FIELD AND BACKGROUND OF THE INVENTION

The present invention relates in general to the processing of dough for the making of bread and bread products, and in particular, to a new and useful dough portioning machine having a rotating cutter.

The making of dough using flour, water and other ingredients, and the subsequent processing of the dough to make bread and bread products such as rolls and the like, has been the subject of mechanization for many years. See for example, the dough processing equipment of U.S. Pat. No. 2,660,131. U.S. Pat. No. 3,927,611 discloses an apparatus for degassing dough by subjecting the dough to compression within a screw conveyor. U.S. Pat. No. 4,948,611 discloses a cutter for portioning dough.

Although a variety of mechanisms are known for portioning or separating a large mass of dough into smaller portions of dough which are rolled and otherwise processed, many problems remain.

One problem concerns the need for cutting or dividing the dough in such a way that all portions are equal. The dough should also be cut in a manner which yields a dough portion which can quickly be rolled into a substantially spherical shape for subsequent processing. The cutting operation is also preferably conducted without the use of oil as a lubricant. The cutting rate must also be as high as possible without mechanically damaging the dough and without materially increasing its temperature. The risk of damage and mechanical considerations place an upper limit on the cutting rate for all currently existing cutting equipment which is below a desired maximum rate for the equipment.

To avoid excessively high capital expenditures, the cutting equipment should also be simple and should be usable with relatively inexpensive support equipment such as degassing and dough rolling devices. This also reduces energy costs in operating the equipment.

The type of mechanical and thermal damage which is experienced with some existing cutters involves the destruction of the natural gluten found in the dough. Gluten is the tough, viscid substance remaining in the flour after it is washed to remove starch. The gluten is very sticky and allows the dough to become homogenous. The more gluten available after the cutting and rounding process, the more pliable is the dough. The availability of gluten also acts to retain gas within the dough portion, in which yeast cells grow, to expand the dough to a large final volume. This produces a more symmetrical and satisfactory end product. The presence of gluten also reduces cracking in the skin of the product when receiving its "oven spring" (that is the jump in height experienced by dough when subjected to heat in an oven).

SUMMARY OF THE INVENTION

An object of the present invention is to provide a dough portioning machine which includes a cutter that can operate at exceptionally high rates while maintaining equal dough portions and minimizing heat and gluten damage.

Another object of the present invention is to provide a dough portioning machine which comprises dough feeding means for supplying dough to an orifice having a mouth, the dough blossoming through the orifice and outwardly of the mouth; a cutting wire for cutting the dough; and wire drive means connected to the wire for moving the wire in a circular path across the mouth for cutting the dough which has blossomed outwardly of the mouth into a portion which is separated from remaining dough in the orifice.

A still further object of the present invention is to provide a dough portioning machine wherein the dough feeding means includes degassing means for compressing the dough to exclude gas therefrom, before the dough is supplied to the orifice.

According to additional features of the present invention, a drum is mounted for rotation about an axis, adjacent the mouth. The wire is fixed to the drum and is moved in its circular path across the mouth as the drum rotates.

A free outer end of the wire moves under a guide which is positioned on an opposite side of the mouth from the drum, for holding the wire against the orifice mouth surface to ensure an accurate portioning of the dough. The surface of the mouth is made of wear resistant material as is the guide. At some point along the circular path of the wire, a wedge shaped ramp is provided. The wire is deflected as it moves up the ramp and is snapped as it leaves the ramp. This snapping action cleans the wire by removing any dough or other material which has stuck to the wire, in preparation for the next cutting cycle.

In contrast to conventional cutters and associated equipment which can cut dough at a maximum rate of approximately 100 to 125 cuts per minute, the rotary cutter of the present invention is capable of cutting dough at a rate in excess of 300 cuts per minute. Despite this increased speed, the dough is cut without increasing its temperature and without gluten damage. Standard degassing and cutting equipment normally increases the temperature of the dough from 3° to 5° F. The present invention increases the dough temperature by from 0° to 0.5° F. The decrease of temperature rise also permits the dough to be mixed more fully. Since additional time is provided for in the mixing operation, more complete mixing can be accomplished, allowing for more gluten development and water absorption to yield improved products. The same equipment if provided with the cutter of the present invention, allows for approximately two additional minutes of mixing which results in a 2% more water content for the dough. The increased water content in combination with the increased mixing time still provides dough which exhibits a correct dryness and extensibility which is needed for the dough processing machinery.

Thus, a still further object of the present invention is to provide a dough portioning machine with a specialized cutting wire, which is simple in design, rugged in construction, dependable and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the preferred embodiment of the invention is illustrated.

DESCRIPTION OF THE PREFERRED EMBODIMENT

Figure 1:
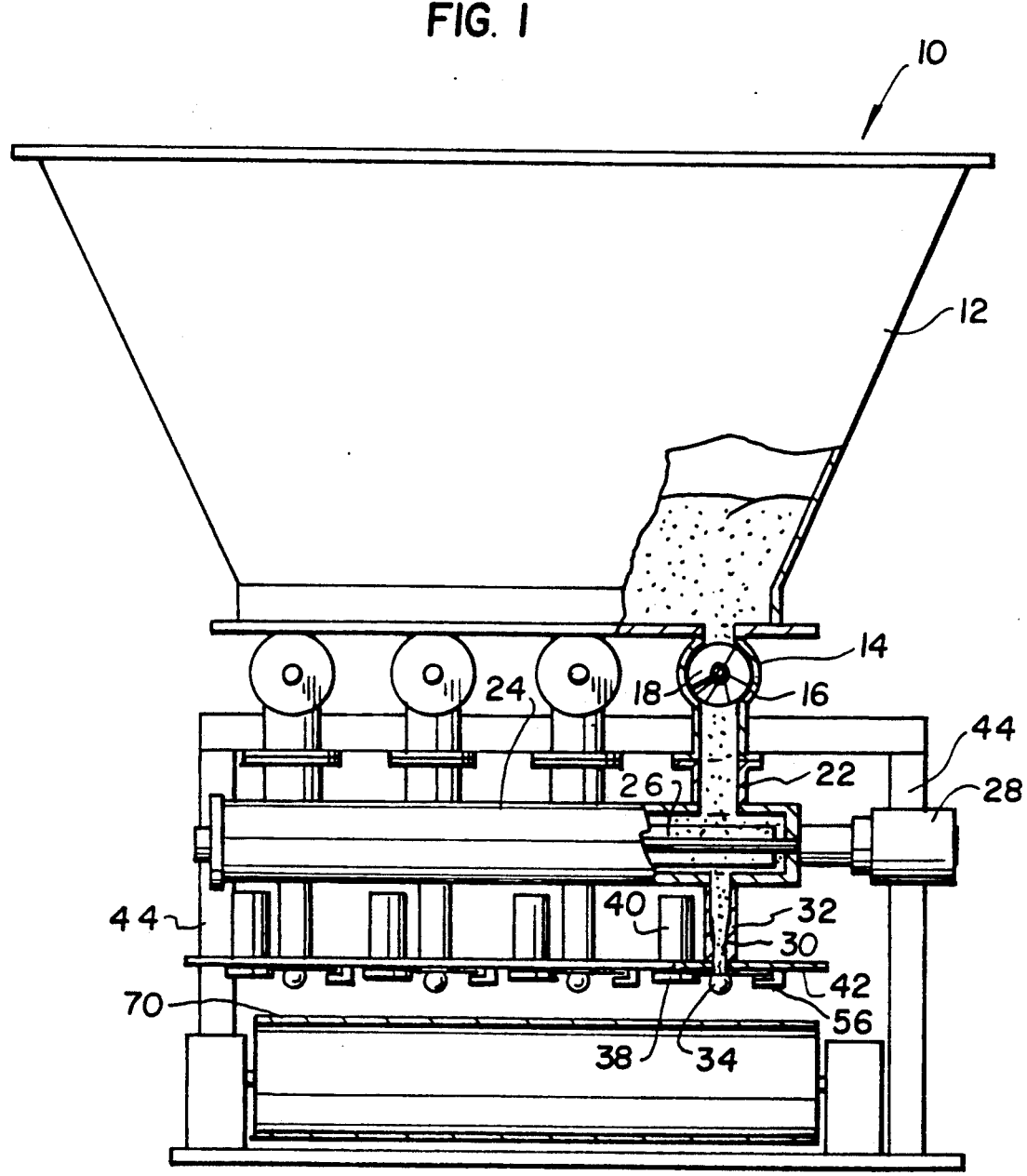
FIG. 1 is a front elevational view of a dough portioning machine incorporating the cutting apparatus of the present invention, with portions cut away.
Figure 2:
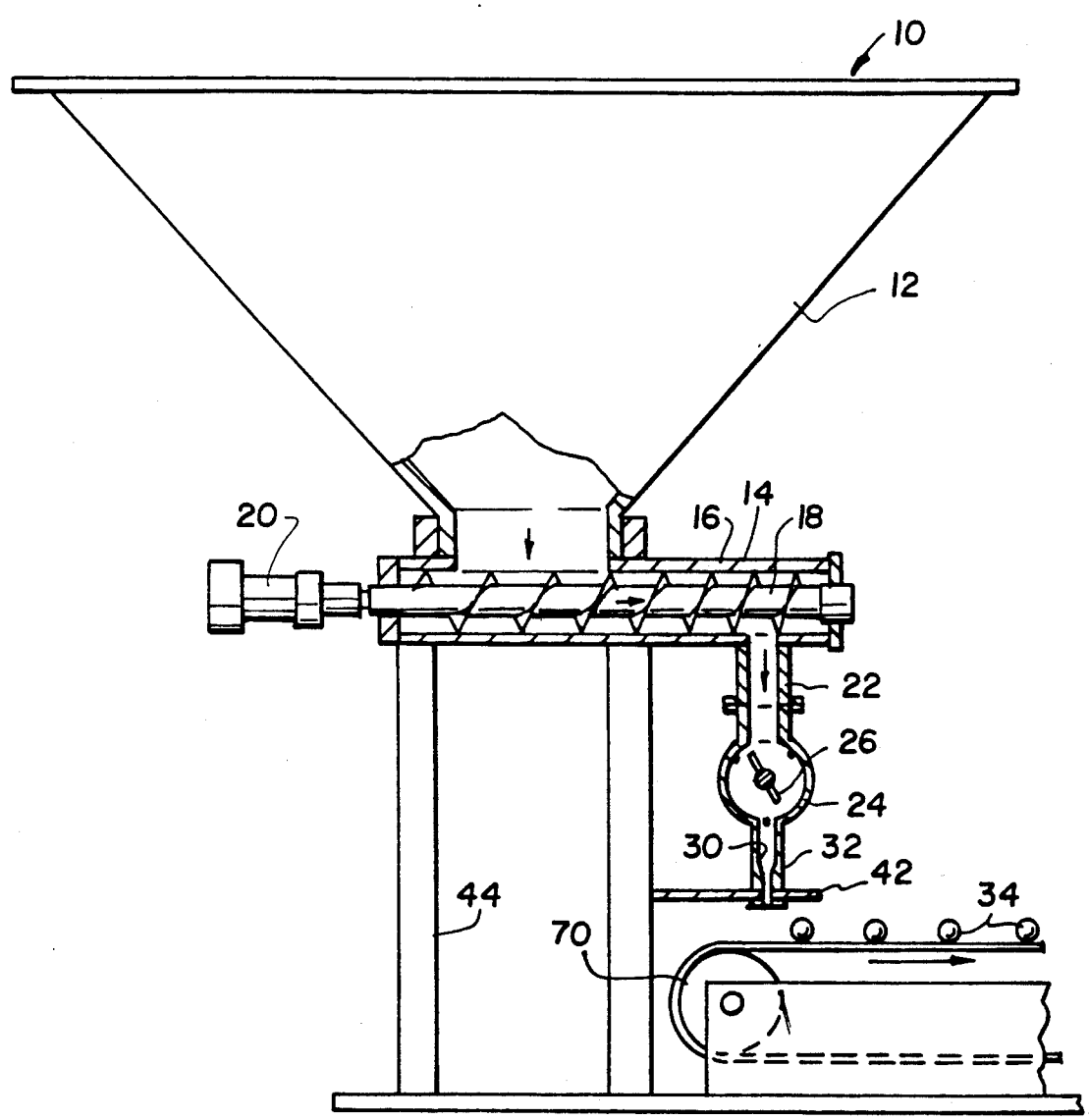
FIG. 2 is a side elevational view, partly in section of the machine of FIG. 1.

Referring to the drawings in particular, the invention embodied in FIGS. 1 and 2 comprises a dough portioning machine generally designated 10 having an upper hopper 12 for receiving a supply of dough.

Four openings in the bottom of hopper 12, communicate with an equal number of degassers 14. As best shown in FIG. 2, each degasser comprises a cylinder 16 containing a screw 18 which is rotated by a motor 20. Screw 18 has a varying pitch which increases from one end of cylinder 16 under the hopper 12 to the opposite end of the cylinder. This serves to compress and thus remove gas from the dough in accordance with the teaching of U.S. Pat. No. 3,927,611. A conduit 22 connects the outlet end of degasser 14 to a cylindrical chamber 24 which receives degassed dough from each of the four degassers 14. The pressure among the four degassers is thus equalized in chamber 24. A paddle 26 is mounted for rotation in chamber 24 and is rotatable by a motor 28. It serves to texturize the dough in the chamber 24 to a consistency satisfactory to the baker.

If the dough from the degassers 14 is already of satisfactory texture, paddle 26 is not rotated.

With the pressure on the dough along chamber 24 equalized, the dough is forced through four orifices 30 positioned in four respective conduits 32 extending from the bottom of chamber 24. Since the dough is under pressure in conduit 32, it tends to blossom outwardly to a virtually spherical shape at the lower mouth of orifice 32, as shown at 34 in FIG. 1. Since all pressure is equalized within chamber 24, each of the spherical blossomed dough portions 34 are of equal size among the four orifices.

Figure 3:
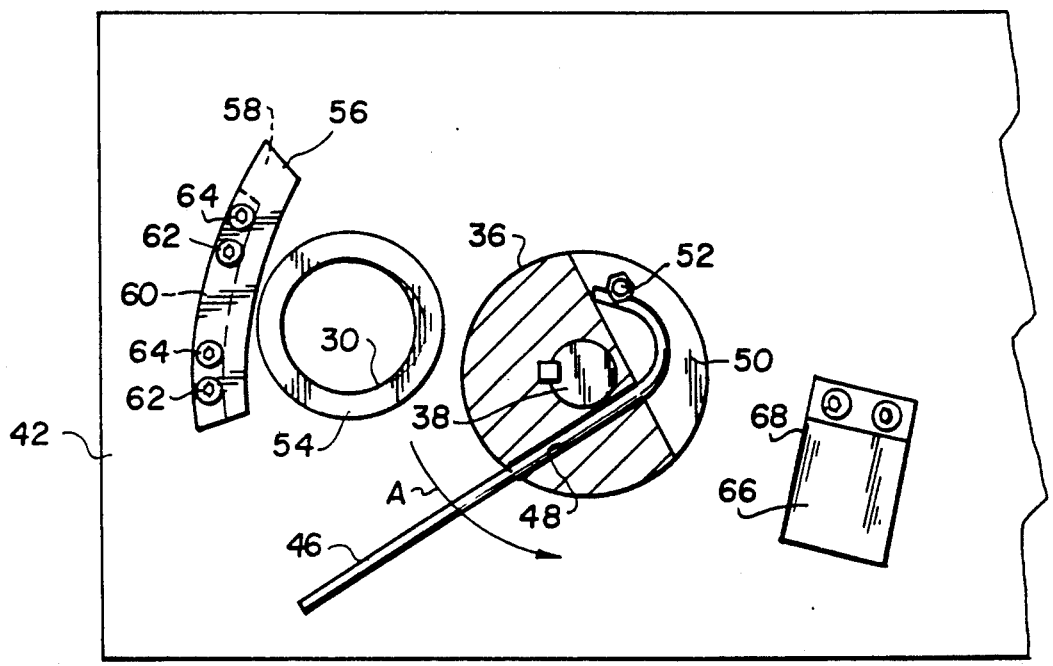
FIG. 3 is a bottom plan view of the machine showing the cutting apparatus, with a drum of the apparatus shown in section.
Figure 4:
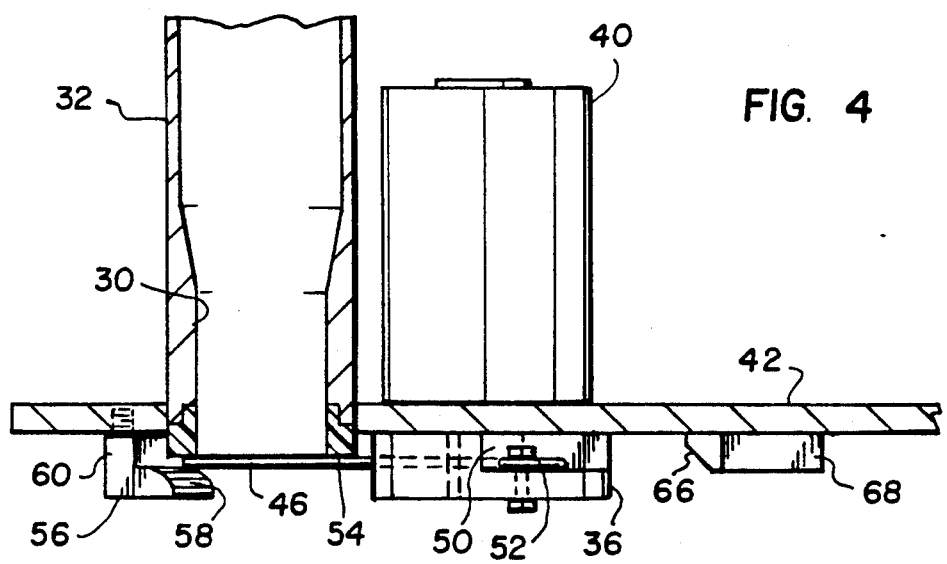
FIG. 4 is a side elevational view of FIG. 3, partly in section.

Referring now to FIGS. 3 and 4, the cutter of the present invention comprises a drum 36 which is mounted for rotation on an axle 38 which is rotated by motor 40. Drum 36 is mounted for rotation below a distribution plate 42 and motor 40 is mounted above the distribution plate. A separate motor and drum is provided for each orifice as shown in FIG. 1. Plate 42 is supported by conduits 32 and a frame work 44 of the machine (see FIG. 2).

A wire 46 which serves as the cutting member of the present invention, extends through a bore 48 lying on a chord of the drum 36, and into an open segment area 50 cut from the surface of drum 36 which lies adjacent the plate 42. In open segment 50, wire 46 is bent in the manner shown in FIG. 3 and retained by a retaining bolt 52. In this way, the free outer end of wire 46 which extends beyond drum 36, is firmly tensioned in the drum and biased toward the rotary cutting direction shown by arrow A, for the drum 36 and the wire 46. Wire 46 is advantageously 90 thousandths piano wire. While this has been found to work best, other stiff, corrosion resistant wire can be used to practice the present invention.

In order to cleanly and quickly cut the blossomed dough portion 34 from the mouth of orifice 30, wire 46 is rotated by drum 36, across the mouth surface 54 of the orifice mouth. To ensure that the wire is held firmly against the mouth surface, the end of wire 46 is rotated under a guide 56 having an inclined inlet end 58. To ensure that the guide has the correct altitude below plate 42, guide 56 is mounted at a block portion 60 thereof to the plate by a pair of hold-down bolts 62 which are threaded into the plate and which are counteracted by a pair of jack bolts 64 which are threaded to the block 60 and bear against the lower surface of plate 42. This provides an adjustable yet fixed position for guide 56.

Guide 56 and the orifice mouth area are advantageously made of wear resistant, low friction and non-toxic material. The material currently preferred is an acetal product impregnated with tetrafluoroethylene fibers. An example of this material is known by the trademark DELRIN-AF (a trademark of E. I. Du Pont).

After completing a cut, wire 46 is moved in the direction of arrow A up the ram 66 of a wedge 68 fixed to the bottom surface of plate 42. This deflects the free end of the wire away from the plate 42 and, as the wire leaves the ramp, allows the wire to snap back to its original position. This has been found to effectively clean the wire of any dough particles in preparation for subsequent dough cutting step.

In practice, drum 36 can be rotated from 50 to 400 rpm to produce any desired cutting rate, and in particular an extremely high cutting rate of more than 300 cuts per minute.

Since the wire never obscures the opening, no back pressure fluctuations occur and the dough is free to blossom into its nearly spherical shape before it is cut from the orifice mouth and drops onto a conveyor 70 (approximately a two inch drop). Conveyor 70 brings the equally cut dough portions to a further apparatus which rolls the portions into perfect spheres in preparation for further processing which is not the subject of the present application.

Although known cutters using blades or similar structures normally require lubrication to avoid having the dough stick to the cutting surface, no lubrication is needed for the cutter of the present invention. Wire 46 also minimizes any heat build-up and avoids any damage to the dough gluten.

While a specific embodiment of the invention has been shown and described in detail to illustrate the application of the principles of the invention, it will be understood that the invention may be embodied otherwise without departing from such principles.

What is claimed is:

1. A dough portioning machine comprises:
    dough feeding means for supplying dough to an orifice having a mouth, the dough blossoming through the orifice and outwardly of the mouth;
    a cutting wire for cutting the dough;
    wire drive means connected to the wire for moving the wire in a circular path across the mouth for cutting the dough which has blossomed outwardly of the mouth into a portion which is separated from remaining dough in the orifice;
    said orifice mouth including a mouth surface lying in the plane of the circular path, the mouth surface being made of wear resistant material; and guide means mounted adjacent the orifice mouth and opposite said wire drive means, for maintaining said wire against the mouth surface as the wire passes the mouth along the circular path.

2. A machine according to claim 1 wherein said wire drive means comprises a drum, motor means for rotating the drum around an axis which is spaced from the orifice mouth, and means for anchoring the wire to the drum.

3. A machine according to claim 1 wherein said dough feeding means includes degassing means for compressing and removing gas from the dough to supply the dough under pressure to the orifice.

4. A machine according to claim 1 including snap means lying in the circular path for deflecting the wire as it moves along the circular path and allowing the wire to snap back to an undeflected position for cleaning the wire.

5. A machine according to claim 4 wherein said snap means comprises a wedge having an inclined surface intersecting said circular path.

6. A machine according to claim 5 wherein said wire drive means comprises a drum, motor means for rotating the drum around an axis which is spaced from the orifice mouth, and means for anchoring the wire to the drum.

7. A machine according to claim 6 wherein said dough feeding means includes degassing means for compressing and removing gas from the dough to supply the dough under pressure to the orifice.

8. A machine according to claim 7 wherein said dough feeding means further comprises a hopper, said degassing means comprises a cylinder having one end communicating with said hopper and an opposite end communicating with said orifice, and a variable pitch screw mounted for rotation in said cylinder.

9. A machine according to claim 8 including a texturizing chamber connected between said cylinder and said orifice for receiving dough from said cylinder, with a paddle mounted for rotation in said texturizing chamber and rotatable for texturizing dough in said texturizing chamber.

10. A machine according to claim 9 wherein said anchoring means comprises said drum having a bore therein for receiving said wire and means for holding an end of said wire in a bent condition.

11. A dough portioning machine comprising:
a hopper for receiving a supply of dough;
a plurality of degassing means connected to said hopper for receiving dough from said hopper and degassing the dough under pressure, each degassing means having an outlet;
means defining a pressure equalization chamber connected to all outlets of said degassing means for receiving dough from each degassing means and equalizing the pressure of the dough;
a plurality of conduits connected to said chamber, each conduit containing an orifice having a mouth for conveying and discharging dough into a blossomed dough portion at the orifice mouth;
a stiff cutting wire;
drive means for rotating the wire past the orifice mouth to cut each dough portion from the orifice mouth, said drive means comprising means for rotating the wire in a circular path, across the orifice mouth; and
guide means for engaging an outer end of the wire which is spaced from the drive means, to maintain the wire against the orifice mouth as the wire moves in the circular path.

12. A machine according to claim 11 including wedge means lying in the circular path for momentarily deflecting the wire from the circular path and allowing the wire to snap back to the circular path to clean the wire.

13. A machine according to claim 11 including a paddle mounted for rotation in the pressure equalization chamber.

14. A machine according to claim 11 wherein each degassing means comprises a degassing cylinder and a screw mounted for rotation in the degassing cylinder.

15. A machine according to claim 11 wherein said wire drive means comprises a drum having a bore therein for receiving said wire and means for holding an end of said wire in a bent condition.

* * * * *